(12) United States Patent
Miyauchi et al.

(10) Patent No.: US 10,983,466 B2
(45) Date of Patent: Apr. 20, 2021

(54) FIXING MEMBER, FIXING DEVICE, AND ELECTROPHOTOGRAPHIC IMAGE FORMING APPARATUS

(71) Applicant: CANON KABUSHIKI KAISHA, Tokyo (JP)

(72) Inventors: Yohei Miyauchi, Tokyo (JP); Yasuharu Notoya, Tokyo (JP); Kimihiro Yoshimura, Kashiwa (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 17/021,250

(22) Filed: Sep. 15, 2020

(65) Prior Publication Data

US 2020/0409294 A1 Dec. 31, 2020

Related U.S. Application Data

(63) Continuation of application No. PCT/JP2019/010891, filed on Mar. 15, 2019.

(30) Foreign Application Priority Data

Mar. 22, 2018 (JP) .............................. JP2018-055190
Mar. 22, 2018 (JP) .............................. JP2018-055191
(Continued)

(51) Int. Cl.
*G03G 15/20* (2006.01)
*B32B 27/00* (2006.01)
*B32B 27/28* (2006.01)

(52) U.S. Cl.
CPC ....... *G03G 15/2057* (2013.01); *B32B 27/285* (2013.01); *G03G 15/2064* (2013.01); *G03G 2215/2048* (2013.01)

(58) Field of Classification Search
CPC ....... G03G 15/2057; G03G 2215/2016; G03G 2215/2048; B32B 27/06; B32B 27/18;
(Continued)

(56) References Cited

U.S. PATENT DOCUMENTS 5,766,816 A * 6/1998 Nagase .............. G03G 9/08711
430/124.34
6,895,206 B2 5/2005 Nakamura et al.
(Continued)

FOREIGN PATENT DOCUMENTS

JP 08095408 A * 4/1996 ......... G03G 15/2057
JP 9-096981 A 4/1997
(Continued)

OTHER PUBLICATIONS

Y. Kitazaki et al.., "Extended Fowkes' Equation and Evaluation of Surface Tension of Polymer Solid," 8(3) Journal of the Adhesion Society of Japan 131-141 (1972).
(Continued)

*Primary Examiner* — Robert B Beatty
(74) *Attorney, Agent, or Firm* — Venable LLP

(57) ABSTRACT

Provided is a fixing member including a base layer, and a surface layer on an outer surface of the base layer directly or with a primer layer interposed between the base layer and the surface layer, in which the surface layer is constituted by a single layer, the surface layer contains a fluororesin, and fluorine oil having a perfluoropolyether structure, and as for a measurement sample taken from the surface layer, when subjecting to predetermined treatments (i) and (ii), masses of an adhered material adhered in a unit area of a detection surface of a QCM sensor and containing the fluorine oil are within specific ranges.

14 Claims, 4 Drawing Sheets

(30) Foreign Application Priority Data

Feb. 20, 2019 (JP) .............................. JP2019-028560
Feb. 20, 2019 (JP) .............................. JP2019-028564
Feb. 25, 2019 (JP) .............................. JP2019-031702

(58) Field of Classification Search
CPC .. B32B 27/285; B32B 27/30; B32B 2260/046
USPC .............. 399/329, 333; 492/56, 59; 219/216
See application file for complete search history.

(56) References Cited

U.S. PATENT DOCUMENTS

| | | | |
|---|---|---|---|
| 9,250,546 | B2 | 2/2016 | Kameyama et al. |
| 9,575,439 | B2 | 2/2017 | Tsuji |
| 9,951,166 | B2 * | 4/2018 | Fukami ................ C09D 171/00 |
| 2009/0252542 | A1 * | 10/2009 | Creteau .............. G03G 15/2025 |
| | | | 399/329 |
| 2011/0085831 | A1 * | 4/2011 | Hullman ............ G03G 15/2057 |
| | | | 399/329 |
| 2014/0321893 | A1 | 10/2014 | Qi et al. |
| 2019/0300726 | A1 * | 10/2019 | Mitsuhashi ............. C03C 17/32 |
| 2021/0003953 | A1 | 1/2021 | Miyauchi et al. |

FOREIGN PATENT DOCUMENTS

| | | | | |
|---|---|---|---|---|
| JP | 2000-19879 | A | 1/2000 | |
| JP | 2003-029484 | A | 1/2003 | |
| JP | 2004-053847 | A | 2/2004 | |
| JP | 2015-028613 | A | 2/2015 | |
| JP | 2015-212810 | A | 11/2015 | |
| JP | 2018-001109 | A | 1/2018 | |
| JP | 2018-22056 | A | 2/2018 | |
| JP | 2018-180488 | A | 11/2018 | |
| JP | 2019119071 | A * | 7/2019 | |
| WO | 2019/181796 | A1 | 9/2019 | |
| WO | WO-2019181805 | A1 * | 9/2019 | .............. F16C 13/00 |

OTHER PUBLICATIONS

International Search Report in International Application No. PCT/JP2019/010891 (dated Apr. 2019).

International Preliminary Report on Patentability in International Application No. PCT/JP2019/010891 (dated Oct. 2019).

Non-final Office Action in U.S. Appl. No. 17/021,241 (dated Feb. 2021).

* cited by examiner

FIXING MEMBER, FIXING DEVICE, AND ELECTROPHOTOGRAPHIC IMAGE FORMING APPARATUS

CROSS-REFERENCE TO RELATED APPLICATIONS

This application is a Continuation of International Patent Application No. PCT/JP2019/010891, filed Mar. 15, 2019, which claims the benefit of Japanese Patent Application No. 2018-055190, filed Mar. 22, 2018, Japanese Patent Application No. 2018-055191, filed Mar. 22, 2018, Japanese Patent Application No. 2019-028560, filed Feb. 20, 2019, Japanese Patent Application No. 2019-028564, filed Feb. 20, 2019, and Japanese Patent Application No. 2019-031702, filed Feb. 25, 2019, all of which are hereby incorporated by reference herein in their entirety.

BACKGROUND

The present disclosure relates to a fixing member, a fixing device, and an electrophotographic image forming apparatus.

DESCRIPTION OF THE RELATED ART

In a fixing device used for an electrophotographic image forming apparatus (hereinafter, referred to also an "image forming apparatus") such as a copy machine or a laser printer, a pair of heated rotating bodies such as a roller and a roller, a film and a roller, a belt and a roller, and a belt and a belt are in pressure-contact with each other. Then, a recording medium such as a paper which holds an image formed by an unfixed toner is introduced into a pressure-contact portion (hereinafter, referred to as a "fixing nip portion") formed between the rotating bodies, the unfixed toner is heated and melted, thereby fixing the image to the recording medium. A rotating body with which an unfixed toner image formed on the recording medium comes into contact is referred to as a fixing member, and is referred to as a fixing roller, a fixing film, or a fixing belt according to a shape thereof.

In the fixing member for electrophotography, as a surface layer constituting an outer surface which comes into contact with a toner (hereinafter, referred to as a "surface layer"), a surface layer containing a fluororesin, specifically, for example, a copolymer of tetrafluoroethylene ($-C_2F_4-$) and perfluoroalkyl vinyl ether ($-CF_2-CF(ORf)-$) (hereinafter, referred to as also "PFA") is used in order to suppress adhesion of the toner. Here, "Rf" represents a perfluoroalkyl group.

Recently, in an electrophotographic image forming apparatus for commercial printing, it has been proposed to further increase a heat-fixing temperature of a toner in order to achieve a higher process speed. In this case, in a fixing member according to the related art, toner releasability may be insufficient, and a hot offset may occur.

Here, in Japanese Patent Application Laid-Open No. 2018-22056, a liquid repellent film having an outermost surface including a layer containing a fluoropolymer such as PFA obtained by covalently bonding a compound having a perfluoropolyether (hereinafter, referred to as a "PFPE") structure or a perfluoroalkyl group, and a fixing member including the liquid repellent film are disclosed.

SUMMARY

An aspect of the present disclosure is directed to providing a fixing member capable of maintaining high toner releasability over a long period of time. In addition, another aspect of the present disclosure is directed to providing a fixing device which contributes to a stable formation of a high quality electrophotographic image over a long period of time. Furthermore, still another aspect of the present disclosure is directed to providing an electrophotographic image forming apparatus capable of stably forming a high quality electrophotographic image over a long period of time.

According to an aspect of the present disclosure, there is provided a fixing member for electrophotography including: a base layer; and a surface layer provided on an outer surface of the base layer directly or with a primer layer interposed between the base layer and the surface layer,
the surface layer is constituted by a single layer,
the surface layer contains a fluororesin, and fluorine oil having a perfluoropolyether structure, and the fixing member satisfies a requirement (i) and a requirement (ii):
(i) as for a measurement sample taken from the fixing member and including an entire thickness portion of the surface layer, when subjecting to a treatment including cleaning a predetermined position of a first surface of the measurement sample which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered material adhered in a unit area (1 $cm^2$) of the detection surface and including the fluorine oil having the perfluoropolyether structure is $1.0 \times 10^2$ ng or more and $1.0 \times 10^4$ ng or less; and
(ii) as for the measurement sample subjected to the treatment defined in the requirement (i), when subjecting to a treatment including, after cleaning the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered material adhered in the unit area (1 $cm^2$) of the detection surface and including the fluorine oil having the perfluoropolyether structure is $0.5 \times P11$ or more and $1.2 \times P11$ or less.

In addition, according to another aspect of the present disclosure, there is provided a fixing member for electrophotography including: a base layer; and a surface layer provided on an outer surface of the base layer directly or with a primer layer interposed between the base layer and the surface layer,
in which the surface layer is constituted by a single layer,
the surface layer contains a fluororesin, and fluorine oil having a perfluoropolyether structure, and
as for a measurement sample taken from the fixing member and including an entire thickness portion of the surface layer, when subjecting to pressing a detection surface of a quartz crystal microbalance (QCM) sensor against a first surface of the measurement sample which is an opposite side to a side facing the base layer at a pressure of 0.4 MPa and a temperature of 180° C. for 50 msec, a mass of an adhered material adhered in a unit area (1 $cm^2$) of the detection surface and including the fluorine oil having the perfluoropolyether structure is defined as P11 (ng), and
when pressing the detection surface of the quartz crystal microbalance (QCM) sensor against a second surface of the measurement sample which is the side facing the base layer of the measurement sample at a pressure of 0.4 MPa and a temperature of 180° C. for 50 msec, a mass of an adhered material adhered in the unit area (1 $cm^2$) of the detection surface and including the fluorine oil having the perfluoropolyether structure is defined as P21 (ng), P21>P11.

Further, according to still another aspect of the present disclosure, there is provided a fixing device including: the fixing member; and a heating unit of the fixing member.

Further, according to still another aspect of the present disclosure, there is provided an electrophotographic image forming apparatus including the fixing device.

Further features of the present disclosure will become apparent from the following description of exemplary embodiments with reference to the attached drawings.

DESCRIPTION OF THE EMBODIMENTS

Figure 1:
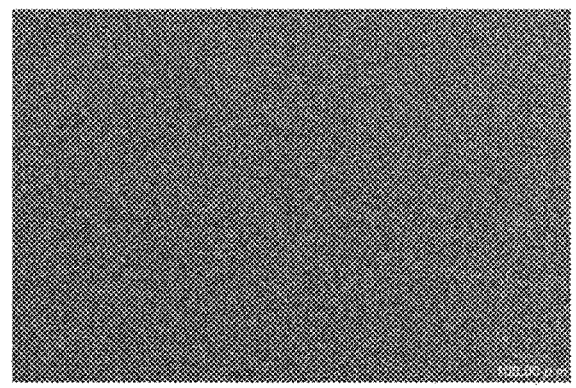
FIG. 1 is a surface observation image of a fixing member according to Example 1.

According to examination by the present inventors or the like, it was observed that the fixing member according to Japanese Patent Application Laid-Open No. 2018-22056 has excellent toner releasability. Then, the present inventors or the like found that the fixing member according to Japanese Patent Application Laid-Open No. 2018-22056 is subjected to heat fixing under a condition in which a surface temperature is a high temperature such as 200° C., but the toner releasability on an outer surface of the fixing member is deteriorated and a hot offset occurs due to long-term use in some cases.

It is considered that such deterioration in toner releasability with time is due to long-term exposure to a high temperature. That is, it is thought that this is because a chemical bonding portion of a compound having a perfluoropolyether chain or a perfluoroalkyl chain, and a fluororesin, which contributes to improvement of toner releasability, is decomposed, and these compounds are lost from the outer surface of the fixing member. Therefore, the present inventors or the like have conducted extensive studies to obtain a fixing member capable of maintaining excellent toner releasability even after long-term use. As a result, the present inventors found that the fixing member according to the above-described embodiment can achieve such an object well. Hereinafter, a fixing member according to each embodiment will be described.

A fixing member according to an embodiment of the present disclosure includes a base layer, and a surface layer provided on an outer surface of the base layer directly or with a primer layer interposed between the base layer and the surface layer. The surface layer is constituted by a single layer, and the surface layer contains a fluororesin and fluorine oil having a perfluoropolyether structure. Furthermore, the fixing member satisfies a requirement (i) and a requirement (ii).

Requirement (i): as for a measurement sample taken from the fixing member and including an entire thickness portion of the surface layer, a predetermined position of a first surface which is an opposite side to a side facing the base layer is cleaned. Thereafter, a treatment in which a detection surface of a quartz crystal microbalance (QCM) sensor is pressed against the position at a pressure of 0.4 MPa and a temperature of 180° C. for 50 msec is performed. In this case, a mass P11 of an adhered material adhered in a unit area (1 cm$^2$) of the detection surface and including the fluorine oil is $1.0 \times 10^2$ ng or more and $1.0 \times 10^4$ ng or less.

Requirement (ii): as for the measurement sample subjected to the treatment defined in the requirement (i), after the position is cleaned, the measurement sample is placed in an environment of a temperature of 180° C. for 120 sec. Next, a treatment in which the detection surface of the QCM sensor is pressed against the position at a pressure of 0.4 MPa and a temperature of 180° C. for 50 msec is performed. In this case, a mass P12 of an adhered material adhered in the unit area (1 cm$^2$) of the detection surface and including the fluorine oil is 0.5×P11 or more and 1.2×P11 or less.

The treatment defined in the requirement (i) is considered as a treatment for transferring the fluorine oil contained in the surface layer onto the first surface (hereinafter, referred to as an "outer surface" in some cases) of the opposite side to the side facing the base layer of the surface layer. That is, press conditions (pressure, temperature, and pressurization time) for the outer surface in the treatment defined in (i) above are set to correspond to conditions applied to the outer surface of the surface layer of the fixing member in a fixing nip during heat fixing in an electrophotographic image forming process.

In addition, the amount of fluorine oil present on the outer surface of the fixing member can be measured by using a quartz crystal oscillator. The quartz crystal oscillator has a sensitivity that enables measurement of a mass of the order of nanograms. The quartz crystal oscillator has a structure in which both side surfaces of a quartz crystal plate are interposed between metal electrodes, and oscillates at a constant frequency (resonance frequency) by a reverse voltage drop of crystals when an alternating electric field is applied to the metal electrodes positioned on the both sides of the quartz crystal plate, respectively. Then, when substances adhere to the metal electrode in a trace amount, the resonance frequency is reduced in proportion to the adhesion amount thereof. By utilizing this phenomenon, the quartz crystal oscillator can be used as a microbalance.

The amount of change in frequency of the quartz crystal oscillator and a mass of substances adhering to the metal electrodes follow the following Sauerbrey equation (Equation (a)).

$$\Delta F = \frac{-2F_0^2}{\sqrt{\rho_Q \mu_Q}} \cdot \frac{\Delta m}{A} \quad \text{(Equation a)}$$

(In Equation (a), ΔF: frequency change, Δm: amount of change in mass, $F_0$: basic frequency, $\rho_Q$: density of quartz crystal, $\mu_Q$: shearing stress of quartz crystal, A: electrode area).

This measurement method is referred to as a quartz crystal microbalance (QCM) method.

Furthermore, in the "cleaning" according to the requirement (i), a nonwoven fabric impregnated with ethanol is placed at the position, a load of 20 kPa is applied onto the nonwoven fabric, and the nonwoven fabric is reciprocated at the position 10 times. Subsequently, a nonwoven fabric impregnated with toluene is placed at the position, a load of 20 kPa is applied onto the nonwoven fabric, and the nonwoven fabric is reciprocated at the position 10 times. By doing so, the fluorine oil present on the outer surface is mechanically removed. Meanwhile, ethanol and toluene do not dissolve PFPE, and thus do not elute PFPE present in the surface layer.

Therefore, the requirement (i) shows that the amount of the fluorine oil permeated into the first surface of the surface layer by the press treatment defined in the requirement (i), the fluorine oil being present in the surface layer, is $1.0 \times 10^2$ ng or more and $1.0 \times 10^4$ ng or less. In addition, adhesion of the toner to the outer surface of the fixing member during the heat fixing can be significantly suppressed by setting P11 within the above numerical range. As a result, an occurrence of a toner offset during the heat fixing can be prevented. In addition, an occurrence of an offset due to cohesive failure of the toner caused by viscosity of the fluorine oil can be prevented. In addition, P11 is more preferably $1.0 \times 10^2$ ng or more and $5.0 \times 10^3$ ng or less.

As a method of preparing a measurement sample including the entire thickness portion of the surface layer from the fixing member, for example, when the fixing member has a structure in which a primer layer and a surface layer are sequentially laminated on a base layer, a method of cutting out a laminate of the primer layer and the surface layer and removing the primer layer from the laminate can be used. Examples of the method of removing the primer layer from the laminate can include a method of separating the primer layer from an interface portion of the surface layer with a knife, and a method of dissolving and removing only the primer layer by using a solvent that can dissolve a resin component in the primer layer without dissolving the fluororesin in the surface layer. For example, in a case where the primer layer contains silicone rubber, only the primer layer can be dissolved and removed from the laminate by using a resin solvent (trade name: e Solv 21RS, manufactured by Kaneko Chemical Co., Ltd.).

Next, in the treatment according to the requirement (ii), in the measurement sample obtained by transferring the fluorine oil contained in the surface layer onto the first surface of the surface layer by the treatment according to the requirement (i), the cleaning for removing the fluorine oil transferred onto the first surface by the treatment according to the requirement (i) is performed. Then, it is a treatment for transferring the fluorine oil from the inside of the measurement sample onto the first surface, after the measurement sample is placed in a predetermined environment. Here, the "cleaning" refers to the same operation as the "cleaning" in the requirement (i). In addition, in the fixing member according to the present embodiment, when the mass of adhering material adhering in the unit area of the detection surface of the QCM sensor and including the fluorine oil when the treatment according to the requirement (ii) is performed is defined as P12, P12 is 0.5 times or more and 1.2 times or less as much as P11. This means that the fluorine oil can be transferred onto the outer surface from the inside of the surface layer in an appropriate amount in which excellent toner releasability is exhibited on the first surface of the surface layer, even after the fluorine oil transferred onto the outer surface is removed by the treatment according to the requirement (i).

That is, in the fixing member satisfying the requirement (i) and the requirement (ii), the fluorine oil is supplied from the inside of the surface layer to the outer surface even though the fluorine oil on the outer surface is consumed once in one heat fixing step, and high toner releasability can be thus maintained over a long period of time.

In the press treatment according to each of the requirements (i) and (ii), for example, a tack tester (trade name: TAC-1000, manufactured by RHESCA CO., LTD.) can be used. Specifically, the quartz crystal oscillator is mounted on a stage portion of the tester. Meanwhile, the measurement sample taken from the fixing member and including the entire thickness portion of the surface layer is fixed to a probe of the tester so that the first surface of the measurement sample faces the quartz crystal oscillator. Next, the first surface of the measurement sample is pressed against the quartz crystal oscillator by bringing the probe into contact with the stage portion. The press conditions are as follows.

Pressure: 0.4 MPa,
Press time: 50 msec,
Press-in amount constant mode,
Press and pull rate: 1.0 mm/sec,
Probe setting temperature: 180° C.

1. Fixing Member

Figure 3:
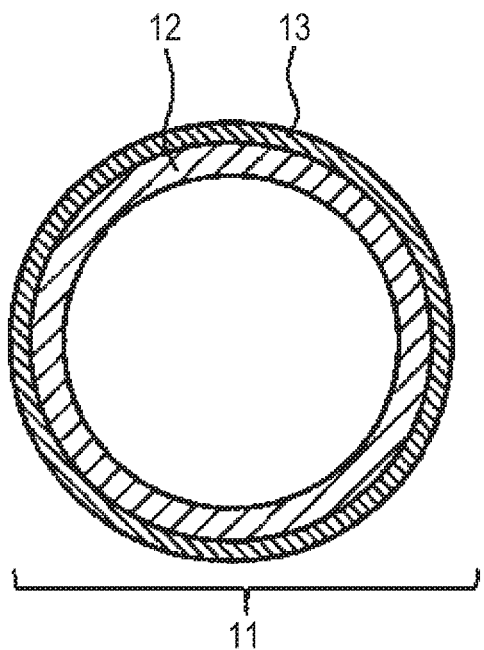
FIG. 3 is a cross-sectional schematic view of a fixing belt which is an example of the present disclosure.

FIG. 3 is a cross-sectional view illustrating an embodiment of the fixing member according to the present disclosure. FIG. 3 illustrates the fixing member having an endless belt shape (hereinafter, referred to also a "fixing belt 11").

According to FIG. 3, the fixing member includes a base layer 12 and a surface layer 13 covering an outer surface of the base layer. It should be noted that the surface layer 13 may be provided on the outer surface of the base layer 12 with a primer layer (not illustrated) interposed between the surface layer 13 and the base layer 12.

Figure 6A:
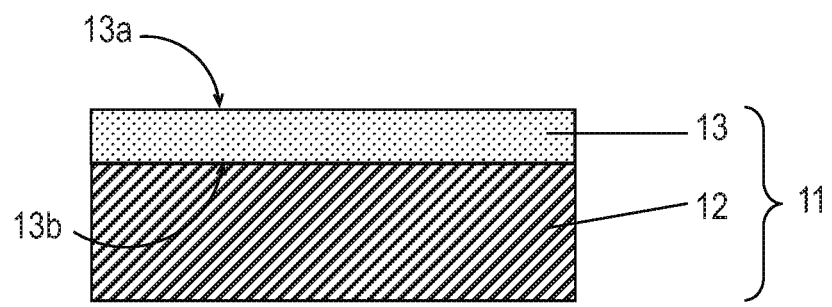
FIG. 6A is a cross-sectional schematic view of the fixing member according to the present disclosure.
Figure 6B:
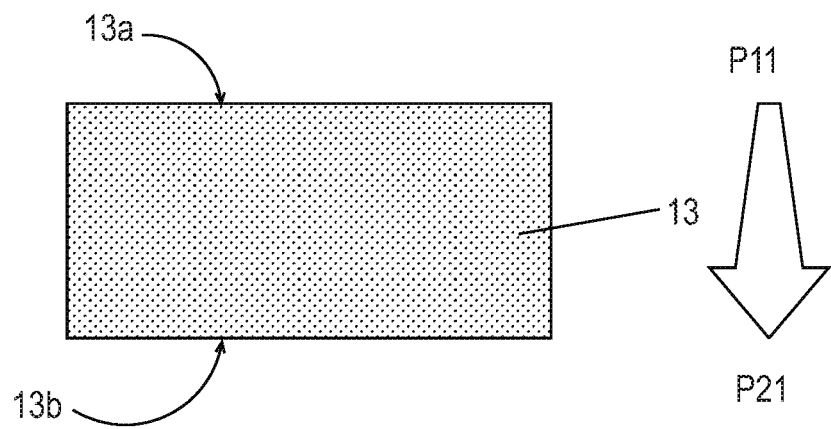
FIG. 6B is a schematic view of the amount of fluorine oil in a surface layer according to the present disclosure.

FIG. 6A is a cross-sectional view illustrating a relationship between the base layer 12 and the surface layer 13 of the fixing member according to the present embodiment, and a first surface (outer surface) 13a of the surface layer 13 of an opposite side to a side facing the base layer and a second surface 13b of the surface layer 13 of the side facing the base layer. FIG. 6B illustrates that, in the surface layer 13, when the mass P11 of the fluorine oil in the first surface is compared with the mass P21 of the fluorine oil in the second surface, P21 is greater than P11.

(1) Base Layer

A metal and an alloy such as aluminum, iron, stainless steel, or nickel, and a heat-resistant resin such as polyimide are used as a material for the base layer 12.

In the fixing belt 11, a substrate having an endless belt shape may be used as the base layer 12. An example of a material for the base layer 12 in this case can include a material having excellent heat resistance such as nickel, stainless steel, or polyimide. A thickness of such a base layer 12 is not particularly limited, but is preferably 20 μm or more and 100 μm or less, for example, from the viewpoints of strength, flexibility, and heat capacity.

The outer surface of the base layer 12 may be subjected to a surface treatment for imparting adhesiveness to the surface layer 13. For the surface treatment, a physical treatment such as a blast treatment, a lapping treatment, or polishing, and a chemical treatment such as an oxidation treatment, a coupling agent treatment, or a primer treatment can be used alone or in combination. Examples of a primer used in the primer treatment can include a coating material in which a silane coupling agent, a silicone polymer, hydrogenated methylsiloxane, alkoxysilane, a reaction accelerating catalyst, and a coloring agent such as red iron oxide are appropriately mixed and dispersed in an organic solvent.

(2) Surface Layer

The surface layer 13 contains a fluororesin and fluorine oil having a perfluoropolyether (PFPE) structure. In addition, the surface layer satisfies the requirement (i) and the requirement (ii) described above.

A fixing member satisfying the requirement (i) and the requirement (ii) can be achieved by, for example, a surface layer containing a large amount of fluorine oil on a base layer side rather than on an outer surface side in a thickness direction of the surface layer.

For example, as for the measurement sample taken from the fixing member and including the entire thickness portion of the surface layer, a detection surface of a quartz crystal microbalance (QCM) sensor is pressed against the second surface which is the side facing the base layer at a pressure of 0.4 MPa and a temperature of 180° C. for 50 msec. In this case, when a mass of an adhered material adhered in a unit area (1 cm$^2$) of the detection surface and including the fluorine oil having the perfluoropolyether structure is defined as P21 (ng), the fixing member in which P21 and P11 have a relationship of the following Expression (1) can achieve the requirement (i) and the requirement (ii).

$$P21 > P11 \quad (1)$$

It was thought that the fluororesin is difficult to interact with the fluorine oil without phase separation, because both the fluororesin and the fluorine oil have small surface free energy. However, the present inventors or the like found that the fluorine oil can be contained in the surface layer without the phase separation with the fluororesin by bringing the fluorine oil into contact with the outer surface of the surface layer at a temperature around a melting point of the fluororesin in the surface layer. In addition, as a result of allowing the fluorine oil to be contained in the surface layer by such a method, the fluorine oil penetrated to the vicinity of an interface between the surface layer and the base layer in the thickness direction of the surface layer, and a concentration of the fluorine oil in the vicinity of the interface is higher than that on a first surface side of the surface layer.

The reason why the concentration of the fluorine oil is high on a side of the surface layer close to the base layer is unclear, but it is presumed as follows. First, by contacting the fluorine oil at around the melting point of the fluororesin, the fluorine oil rapidly diffuses in the fluororesin and reaches the vicinity of the interface with the base layer. Next, in a process of cooling the surface layer from around the melting point of the fluororesin to room temperature, a molecular contraction of the fluororesin in the surface layer occurs, and the fluorine oil is released from the first surface side to the first surface of the surface layer. As a result, it is considered that the concentration of the fluorine oil in the surface layer on the interface side of the base layer is higher than that on the first surface side of the surface layer.

In addition, a concentration gradient of such a fluorine oil is formed in the surface layer, such that the surface layer functions as a reservoir of the fluorine oil. Therefore, it is considered that, even though the fluorine oil on the first surface of the surface layer is consumed during the heat fixing, the fluorine oil in the surface layer is continuously supplied to the first surface by a principle of substance diffusion, and toner releasability on the outer surface of the fixing member is thus maintained even after long-term use.

It should be noted that a concentration difference in fluorine oil on the first surface side and on the interface side (second surface side) of the base layer in the thickness direction of the surface layer can be easily confirmed, for example, by measurements with infrared spectroscopy.

The fixing member according to the present embodiment can be produced by any method as long as fluorine oil having a PFPE structure can be contact-impregnated at a temperature around the melting point of the fluororesin contained in the surface layer. The surface layer to be brought into contact with the fluorine oil may be a surface layer in a fixing member in which a base layer and a surface layer are laminated in advance. In addition, the fixing member can be produced, for example, by a dipping method as a contact method.

Specifically, for example, in a case where the surface layer contains a copolymer (PFA) of tetrafluoroethylene ($-C_2F_4-$) and perfluoroalkyl vinyl ether ($-CF_2-CF(ORf)-$) as a fluororesin, the surface layer can be obtained through the following step a) to step c).

Step a) a pre-fixing member in which a base layer and a resin layer containing PFA are laminated is attached to a dipping device.

Step b) the pre-fixing member is dipped in a fluorine oil bath heated at around a melting point of PFA (300° C.±50° C.) in advance, and is left for 5 minutes.

Step c) after the pre-fixing member is taken out from the fluorine oil bath, PFPE adhered to an outer surface of the resin layer is removed and cooled to room temperature.

The temperature of the fluorine oil bath in the step b) correlates with the amount of the fluorine oil impregnated with the resin layer, and the impregnation amount is increased as the temperature is high. In addition, a contact time may be several minutes to several tens of minutes. A method of removing an excess amount of PFPE adhered to the surface is not particularly limited, but an example thereof can include a method of cleaning with a fluorine solvent or removing with the air.

It should be noted that a method of supplying the fluorine oil to the outer surface of the resin layer is not limited to the dipping method described above. For example, as the method of supplying the fluorine oil to the outer surface of the resin layer, a known coating method such as spray coating, roll coating, or beam coating can be used.

<Fluororesin>

The fluororesin is not particularly limited, and specific examples thereof can include a crystalline fluororesin such as polytetrafluoroethylene (PTFE), a tetrafluoroethylene-perfluoroalkyl vinyl ether copolymer (PFA), a tetrafluoroethylene-hexafluoropropylene copolymer (FEP), polychlorotetrafluoroethylene (PCTFE), a tetrafluoroethylene-ethylene copolymer (ETFE), a chlorotrifluoroethylene-ethylene copolymer (ECTFE), polyvinylidene fluoride (PVDF), or polyvinyl fluoride (PVF), and an amorphous fluororesin having a cyclic perfluoropolyether structure. In particular, PFA can be preferably used from the viewpoints of heat resistance, mechanical strength, and workability.

PFA is a copolymer of perfluoroalkyl vinyl ether (hereinafter, referred to as "PAVE") and tetrafluoroethylene (hereinafter, referred to as "TFE"), and PAVE is selected from perfluoromethyl vinyl ether ($CF_2=CF-O-CF_3$), perfluoroethyl vinyl ether ($CF_2=CF-O-CF_2CF_3$), and perfluoropropyl vinyl ether ($CF_2=CF-O-CF_2CF_2CF_3$).

As PFA, a commercially available PFA can be used, and examples thereof can include the following:

"451HP-J", "959HP-Plus", "350-J", "950HP-Plus" (all trade names, manufactured by Chemours-Mitsui Fluoroproducts Co., Ltd.);

"P-66P", "P-66PT", "P-802UP" (all trade names, manufactured by AGC Inc.);

"AP-230", "AP-231SH", and the like (all trade names, manufactured by DAIKIN INDUSTRIES, LTD.); and "6502N" (trade name, manufactured by 3M Company).

The amount of PFPE impregnated with PFA correlates with a content ratio of PAVE in PFA, and the impregnation amount is increased as the content ratio of PAVE is large. It is thought that this is because the fluorine oil easily interacts with an amorphous part of PFA with high molecular mobility. The content ratio of PAVE in PFA is preferably 1 mol % or more and 5 mol % or less, and particularly preferably 3 mol % or more and 5 mol % or less, in a molecular chain. It should be noted that the content ratio of PAVE can be calculated by measuring $^{19}F$ NMR.

Among the commercially available PFAs, PAVE content ratios in "451HP-J", "959HP-Plus", "950HP-Plus", "P-66P", "P-66PT", "AP-231SH", "6502N", and "AW-5000L" are shown in Table 1.

TABLE 1

| Trade name of PFA | PAVE content ratio [mol %] |
|---|---|
| "451HP-J" | 1.4 |
| "959HP-Plus" | 4.2 |
| "950HP-Plus" | 2.8 |
| "P-66P" | 1.3 |
| "P-66PT" | 1.3 |
| "P-802UP" | 1.3 |
| "AP-231SH" | 1.9 |
| "6502N" | 1.5 |
| "AW-5000L" | 1.6 |

<Fluorine Oil>

The fluorine oil has a perfluoropolyether structure, and a specific example thereof can include perfluoropolyether (PFPE) having a structure represented by the following Structural Formula (1). Among such PFPEs, PFPE which is in an oil state at a melting point of the fluororesin is preferably used.

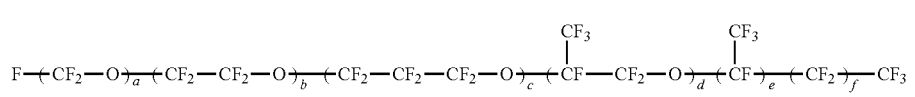

In Structural Formula (1), a, b, c, d, e, and f are each independently 0 or a positive integer, $1 \leq a+b+c+d+e+f \leq 600$, and at least one of a, b, c, or d is a positive integer.

In addition, the occurrence order of the respective repeating units in Structural Formula (1) is not limited to the order described in Structural Formula (1). Further, the respective repeating units may be present at a plurality of locations in PFPE represented by Structural Formula (1). That is, PFPE represented by Structural Formula (1) may be a block copolymer and may be a random copolymer.

A molecular weight of PFPE is 5,000 or more, and particularly preferably 7,000 or more, as a number average molecular weight, from the viewpoint of heat resistance. In addition, the molecular weight of PFPE is 100,000 or less, and particularly preferably 30,000 or less, from the viewpoint of ease of interaction with the fluororesin at the time of contact. Even though PFPE having the above molecular weight is heated in the air at 350° C. for 30 minutes, a weight loss thereof is less than 1%, and thermal decomposition thereof is extremely small even at a temperature around the melting point of the fluororesin.

A content of PFPE in the surface layer is preferably 1.0% by mass or more and 25% by mass or less with respect to a total mass of the fluororesin and PFPE. When the content of PFPE is 1% by mass or more, the releasability of the surface layer can be improved. In addition, when the content of PFPE is 25% by mass or less, PFPE is less likely to be excessively supplied to a nip portion, and an occurrence of the toner offset can be further preferably suppressed.

Specific examples of PFPE having a structure included in the structure represented by Structural Formula (1) can include the following. As an example, PFPE having at least one chemical structure selected from the group consisting of Structural Formulas (2) to (4) can be exemplified.

PFPE having a structure represented by Structural Formula (2) (for example, "Demnum S200", "Demnum S100" (all trade names; manufactured by DAIKIN INDUSTRIES, LTD., referred to as "Demnum type")):

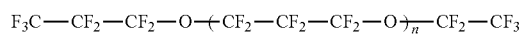

In Structural Formula (2), n represents an integer of 1 or more.

PFPE having a structure represented by Structural Formula (3) (for example, "Krytox GPL107", "Krytox GPL106", "Krytox 143AD", "Krytox VPF16256", "Krytox XHT-500", "Krytox XHT-750", "Krytox XHT-1000" (all trade names; manufactured by The Chemours Company, referred to as "Krytox type")):

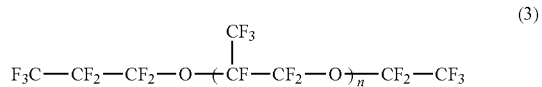

In Structural Formula (3), n represents an integer of 1 or more.

PFA represented by Structural Formula (4) (for example, "Fomblin M60", "Fomblin M30" (all trade names, manufactured by Solvay S.A., referred to as 237 Fomblin type)):

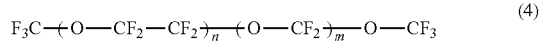

In Structural Formula (4), m and n each independently represent an integer of 1 or more.

An impregnation amount of perfluoropolyether correlates with a solubility parameter. Specifically, the impregnation amount of perfluoropolyether can be calculated by a solubility parameter (HSP value) of benzene and can be controlled by a difference in SP values (ΔHSP value) between the fluororesin and the perfluoropolyether. When the ΔHSP value between two components is small, both are easily dissolved, that is, both are easily mixed with each other, and the impregnation amount is increased.

The ΔHSP value can be calculated by using the 3rd Edition 3.1.14 of calculation software "HSPiP" with database, which is developed and sold by Hansen Inc. As a result of calculating the ΔHSP value between PFA and PFPE, the present inventors or the like found that the ΔHSP values are 2.8, 3.6, and 5.4, in the Krytox type, the Demnum type, and the Fomblin type, respectively, which shows that affinity with PFA varies by a chemical structure of PFPE. That is, in a case where each of PFPEs having the respective chemical structures is brought into contact with PFA under the same conditions, the Krytox type is most compatible with PFA.

A thickness of the surface layer 13 is 3.0 μm or more, more preferably 5.0 μm or more, and particularly preferably 10 μm or more, from the viewpoint of suppression of abrasion on the surface during the use of the fixing member. In addition, the thickness of the surface layer 13 is 50 μm or less, and particularly preferably 40 μm or less, from the viewpoint of suppression of deterioration in thermal conductivity of the fixing member in the thickness direction.

2. Heat Fixing Device

A heat fixing device according to an embodiment of the present disclosure includes a rotating body for heating and a rotating body for pressurization disposed so that it can form a fixing nip portion with the rotating body for heating. Examples of a combination of the rotating body for heating and the rotating body for pressurization can include a heating roller and an elastic pressure roller disposed to face the heating roller, and a heating film and an elastic pressure roller disposed in contact with the heating film. Other examples of the combination of the rotating body for heating and the rotating body for pressurization can include a heating belt and an elastic pressure roller disposed in contact with the heating belt, and a heating belt and an elastic pressure belt disposed in contact with the heating belt.

Figure 4:
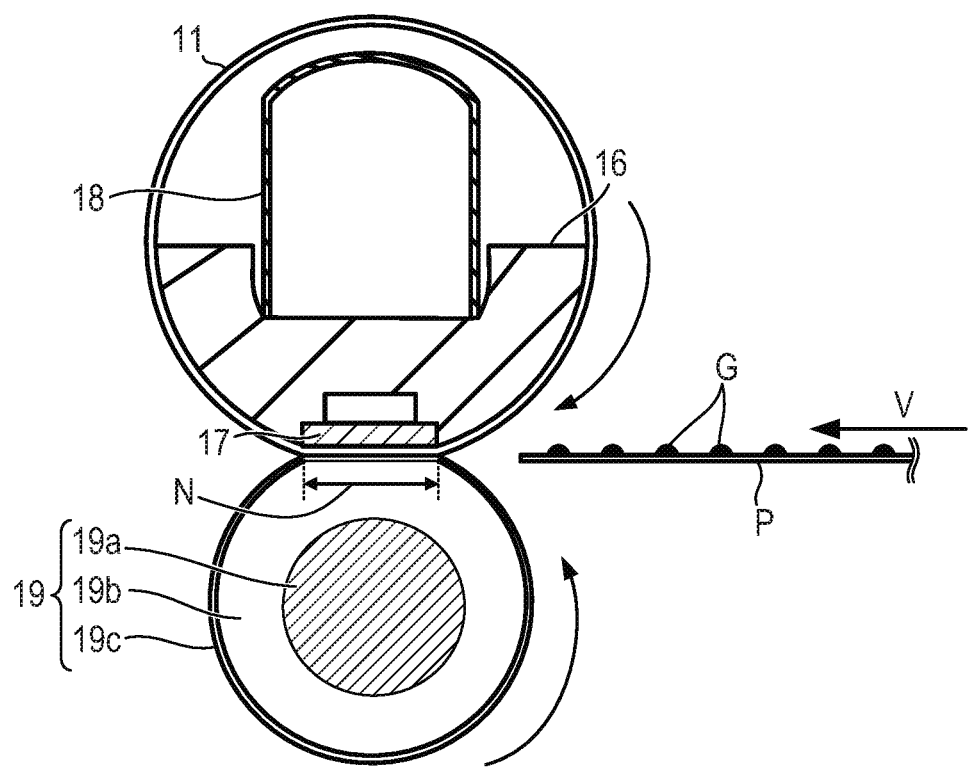
FIG. 4 is a cross-sectional schematic view of a fixing device using the fixing belt according to the present disclosure.

FIG. 4 is a cross-sectional view of a heat fixing device including the fixing belt 11 for heating and an elastic pressure roller 19 in a direction orthogonal to a longitudinal direction of the heat fixing device.

The fixing belt 11 is a fixing belt according to an embodiment of the present disclosure. The fixing belt 11 is loosely and externally fitted to a belt guide member 16. A rigid stay 18 for pressurization is inserted into an inside of the belt guide member 16. The belt guide member 16 is, for example, formed of a resin having heat resistance and heat insulation.

A ceramic heater 17 as a heating source is provided at a position at which the belt guide member 16 comes into contact with an inner surface of the fixing belt 11. The ceramic heater 17 is fitted in a groove portion formed along a longitudinal direction of the belt guide member 16 to be fixed. The ceramic heater 17 is electrified by a unit (not illustrated) to generate heat.

The elastic pressure roller 19 is provided with, for example, an elastic layer 19b containing cured silicone rubber formed on a circumferential surface of a stainless steel core metal 19a. In addition, a surface layer 19c containing a fluororesin is provided on a circumferential surface of the elastic layer 19b. A thickness of the surface layer 19c is, for example, 50 μm.

A pressing force is applied to the rigid stay 18 for pressurization by compressing pressure springs (not illustrated) between both end parts of the rigid stay 18 for pressurization and a spring receiving member (not illustrated) on a side of an apparatus chassis, respectively. By doing so, a lower surface of the ceramic heater 17 disposed on a lower surface of the belt guide member 16 and an upper surface of the elastic pressure roller 19 are in pressed-contact each other with the fixing belt 11 interposed therebetween to form a predetermined fixing nip portion N. That is, the lower surface of the ceramic heater 17 is disposed in contact with an inner circumferential surface of the fixing belt 11.

A recording medium P to be heated on which an image is formed by an unfixed toner G is nipped and conveyed in the fixing nip portion N at a conveying speed V. Accordingly, a toner image is heated and pressurized. As a result, the toner image is melted and color-mixed, and then cooled, thereby fixing the toner image to the recording medium P.

3. Image Forming Apparatus

Examples of the image forming apparatus include a multi-function machine, copier, facsimile machine, and printer using an electrophotographic method. Here, an entire configuration of the image forming apparatus will be schematically described with reference to an example of a color laser printer.

Figure 5:
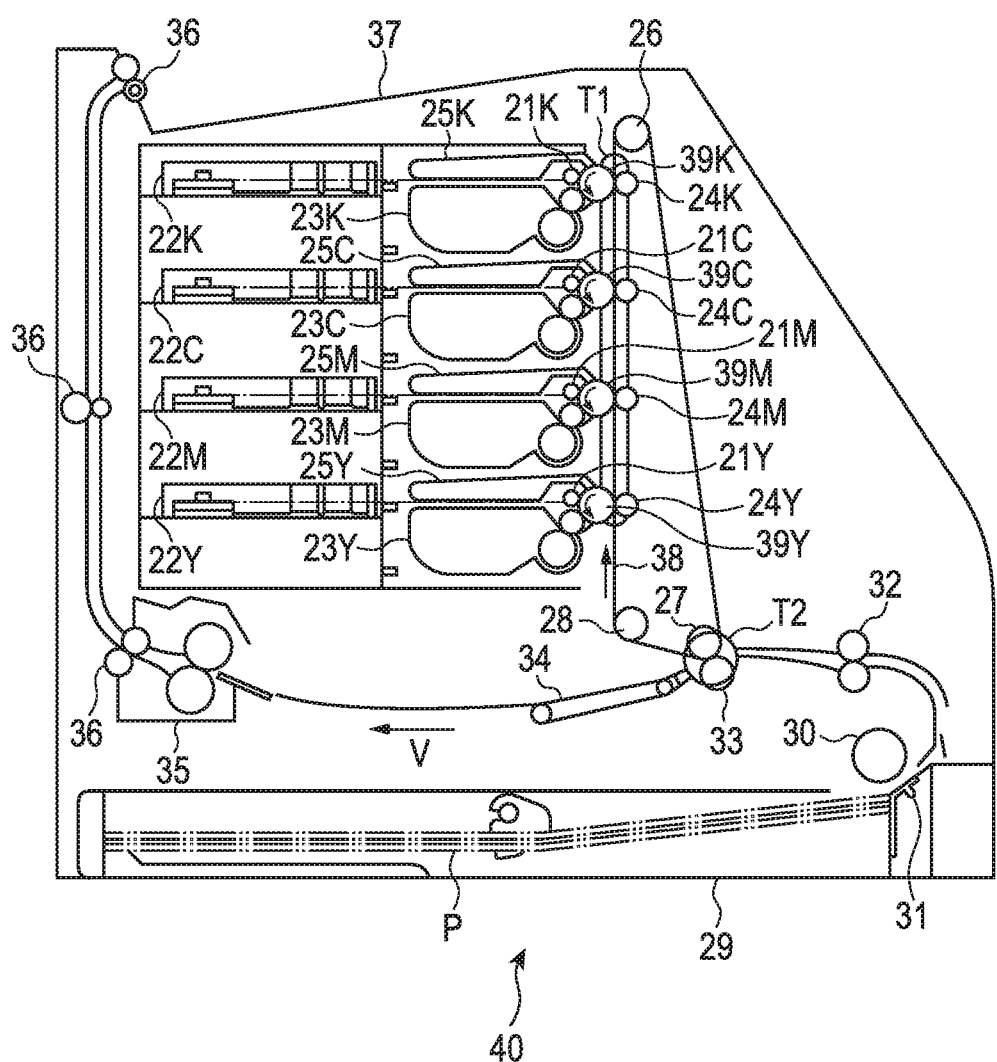
FIG. 5 is a cross-sectional schematic view schematically illustrating an embodiment of an electrophotographic image forming apparatus of the present disclosure.

FIG. 5 is a schematic cross-sectional view of a laser printer 40 according to an embodiment of the present disclosure. The laser printer 40 illustrated in FIG. 5 includes an image forming unit having an electrophotographic photosensitive drum 39 (hereinafter, referred to as a "photosensitive drum 39") rotating at a constant speed for each of colors such as yellow (Y), magenta (M), cyan (C), and black (K). In addition, the laser printer includes an intermediate transfer body 38 which holds a color image developed and multi-transferred in the image forming unit and further transfers the color image onto the recording medium P fed from a feeding unit.

The photosensitive drum 39 (39Y, 39M, 39C, or 39K) is rotatably driven in a counterclockwise direction by drive unit (not illustrated) as illustrated in FIG. 5.

Around the photosensitive drum 39, a charging device 21 (21Y, 21M, 21C, or 21K) which uniformly charges a surface of the photosensitive drum 39, a scanner unit 22 (22Y, 22M, 22C, or 22K) which irradiates a laser beam based on image data so as to form an electrostatic latent image on the photosensitive drum 39, a developing unit 23 (23Y, 23M, 23C, or 23K) which allows a toner to adhere to the electrostatic latent image so as to develop the electrostatic latent image as a toner image, a primary transfer roller 24 (24Y, 24M, 24C, or 24K) which transfers the toner image formed on the photosensitive drum 39 onto the intermediate transfer body 38 in a primary transfer portion T1, and a cleaning unit 25 (25Y, 25M, 25C, or 25K) which has a cleaning blade for removing a transfer residual toner remaining on the surface of the photosensitive drum 39 after transfer, are sequentially disposed in a rotation direction of the photosensitive drum 39.

When the image is formed, a belt-shaped intermediate transfer body 38 stretched by rollers 26, 27, and 28 rotates, and each of color toner images formed on each of the photosensitive drums 39 is simultaneously superimposed and primarily transferred onto the intermediate transfer body 38 to form a color image.

The recording medium P is conveyed to a secondary transfer portion T2 by conveyance unit to be in synchronization with the primary transfer onto the intermediate transfer body 38. The conveyance unit includes a feeding cassette 29 accommodating a plurality of recording media P, a feeding roller 30, a separation pad 31, and a registration roller pair 32. When the image is formed, the feeding roller 30 is rotatably driven according to an image forming operation, the recording media P in the feeding cassette 29 are separated one by one, and the recording medium P is conveyed to the secondary transfer portion T2 by the registration roller pair 32 in synchronization with the image forming operation.

In the secondary transfer portion T2, a movable secondary transfer roller 33 is disposed. The secondary transfer roller 33 is movable in an approximately vertical direction. When the image is transferred, the secondary transfer roller 33 is pressed against the intermediate transfer body 38 with the recording medium P interposed between the secondary transfer roller 33 and the intermediate transfer body 38 at a predetermined pressure. At this time, simultaneously, a bias is applied to the secondary transfer roller 33, and the toner image formed on the intermediate transfer body 38 is thus transferred onto the recording medium P.

The intermediate transfer body 38 and the secondary transfer roller 33 are independently driven, such that the recording medium P interposed between both of them is conveyed toward the left arrow direction illustrated in FIG. 5 at a predetermined conveying speed V, and further conveyed to a fixing unit 35 by a conveyance belt 34 for a next step. In the fixing unit 35, heat and pressure are applied, and the transferred toner image is thus fixed to the recording medium P. The recording medium P is discharged onto a discharge tray 37 on an upper surface of the apparatus by a discharge roller pair 36.

Therefore, the fixing device according to the present embodiment illustrated in FIG. 4 is applied to the fixing unit 35 and the secondary transfer roller 33 of the electrophotographic image forming apparatus illustrated in FIG. 5, such that an image forming apparatus capable of providing a high quality image excellent in uniformity of the image can be obtained.

According to an aspect of the present disclosure, a fixing member capable of maintaining excellent toner releasability even after long-term use can be obtained. In addition, according to another aspect of the present disclosure, a fixing device which contributes to stably forming a high quality electrophotographic image can be obtained. Furthermore, according to still another aspect of the present disclosure, an electrophotographic image forming apparatus capable of stably forming a high quality electrophotographic image over a long period of time can be obtained.

EXAMPLES

Hereinafter, the present disclosure will be specifically described with reference to examples. It should be noted that the present disclosure is not limited to the following examples.

In the present examples, a fixing member is produced by using the following fluororesin and fluorine oil.

(Fluororesin)
PFA-1: "959HP-Plus" (trade name, manufactured by Chemours-Mitsui Fluoroproducts Co., Ltd.)
PFA-2: "451HP-J" (trade name, manufactured by Chemours-Mitsui Fluoroproducts Co., Ltd.)
PFA-3: "950HP-Plus" (trade name, manufactured by Chemours-Mitsui Fluoroproducts Co., Ltd.)
PFA-4: "P66P" (trade name: AGC Inc.)
PFA-5: "AW-5000L" (trade name, manufactured by DAIKIN INDUSTRIES, LTD.)

(Fluorine Oil)
PFPE-1: "Krytox GPL107" (trade name, manufactured by Chemours Company)
PFPE-2: "Krytox GPL106" (trade name, manufactured by Chemours Company)
PFPE-3: "Demnum 5200" (trade name, manufactured by DAIKIN INDUSTRIES, LTD.)
PFPE-4: "Krytox 143AD" (trade name, manufactured by Chemours Company)
PFPE-5: "Krytox VPF16256" (trade name, manufactured by Chemours Company)
PFPE-6: "Krytox XHT-1000" (trade name, manufactured by Chemours Company)
PFPE-7: "Fomblin M60" (trade name, manufactured by Solvay S.A.)

Example 1

(Production of Pre-Fixing Belt)
An endless belt-shaped base layer made of electroformed nickel with an inner diameter of 30 mm, a width of 400 mm, and a thickness of 40 μm was prepared as a base layer. As a primer, an additional curable silicone rubber adhesive (trade name: SE1819CV, an "A liquid" and a "B liquid" were mixed with each other in an equivalent amount, manufactured by Dow Corning Toray Co., Ltd.) was approximately uniformly applied to an outer circumferential surface of the base layer so that a thickness was about m.

Next, for a surface layer, the base layer was covered with a fluororesin tube of which an inner surface was subjected to a hydrophilic treatment (PFA-1, thickness of m, melting point of 296° C.), a surface of the belt was uniformly squeezed from the top of the fluororesin tube, and an excessive additional curable silicone rubber adhesive was thus squeezed out from a space between the base layer and the fluororesin tube.

Then, the base layer whose circumferential surface was covered with the fluororesin tube was put into an electric furnace in which a temperature was set to 200° C., the base layer was heated for 1 hour to cure the additional curable silicone rubber adhesive, and the fluororesin tube was fixed to the outer circumferential surface of the base layer with a primer layer (a cured product of the additional curable silicone rubber adhesive) interposed between the fluororesin tube and the base layer. Finally, both ends were cut off to obtain a pre-fixing belt having a width of 343 mm.

(Contact-Impregnation of Fluorine Oil)
Perfluoropolyether (PFPE-1) was put into a borosilicate glass graduated cylinder. An electric heating wire covered with an insulating material was wound around a main body of the graduated cylinder and heated so that a temperature of PFPE was 285° C. The produced pre-fixing belt was attached to a dipping device, and a main body of the fixing belt was immersed in the heated PFPE. After 5 minutes, the pre-fixing belt was taken out. Thereafter, the pre-fixing belt was dipped in the graduated cylinder into which a separately prepared fluorine-based solvent (trade name: Novec7300, manufactured by 3M Company) was put to remove an excessive PFPE adhered to a surface of the fixing belt. The fluorine-based solvent was dried to prepare a fixing belt No. 1 according to the present example. Two sets of the fixing belts No. 1 were prepared to be used for evaluation to be described below.

In addition, a photograph of a first surface of the fixing belt No. 1 observed with an SEM is illustrated in FIG. 1. It was suggested that PFA was compatible with PFPE with no observation of aggregation of PFPE.

<Evaluation>
Three sets of measurement samples to be used for Evaluation 1 to Evaluation 3 were prepared as follows.

(Preparation of Measurement Sample)

A laminate (diameter of 10 mm) of the primer layer and the surface layer was cut out from the fixing belt No. 1. Next, silicone rubber in the primer layer was dissolved by dipping the laminate in the solvent (trade name: e Solv 21RS, manufactured by Kaneko Chemical Co., Ltd.) in the primer layer to remove the primer layer from the laminate, thereby preparing a measurement sample including an entire thickness portion of the surface layer.

(Evaluation 1: Measurement of Fluorine Oil Adhesion Amounts P11 and P12, and P21)

The first surface which is an opposite side to a side facing the base layer of the measurement sample was cleaned. That is, a nonwoven fabric impregnated with ethanol was placed on the first surface, and a load of 20 kPa was applied onto the nonwoven fabric, and the nonwoven fabric was reciprocated at the position 10 times. Subsequently, a nonwoven fabric impregnated with toluene was placed on the surface, and a load of 20 kPa was applied onto the nonwoven fabric, and the nonwoven fabric was reciprocated at the position 10 times.

Next, a quartz crystal oscillator was placed on a stage portion of a tack tester (trade name: TAC-1000, manufactured by RHESCA CO., LTD.). Meanwhile, the measurement sample was attached to a probe portion of the tack tester so that the first surface faced the quartz crystal oscillator. Next, the probe was brought close to the stage and the quartz crystal oscillator was pressed against the first surface of the measurement sample. The press conditions are as follows.

Pressure: 0.4 MPa,
Press time: 50 msec,
Press-in amount constant mode,
Press and pull rate: 1.0 mm/sec,
Probe setting temperature: 180° C.

As the quartz crystal oscillator, "6A202PN" (trade name, manufactured by Piezo Parts Co., Ltd.) having a basic frequency of around 6 MHz was used. For frequency characteristic measurements before and after attachment, changes in series resonance frequency Fs and frequency Fw indicating a loss of vibration energy before and after press were measured by using a QCM-D intermolecular interaction analysis system (Biolin Scientific AB). An adhesion amount P11 of fluorine oil per unit area (1 cm$^2$) of the quartz crystal oscillator was calculated by Equation (a).

Immediately after completing the press treatment, the measurement sample was removed from the probe and the first surface was cleaned in the same manner as described above. Next, the measurement sample was placed in an environment of a temperature of 180° C. for 120 sec, the measurement sample was attached to the probe again, and the measurement sample was pressed against the quartz crystal oscillator under the same press conditions as described above. Then, the changes in the series resonance frequency Fs and the frequency Fw indicating the loss of the vibration energy were measured to calculate an adhesion amount P12 of fluorine oil per unit area (1 cm$^2$) of the quartz crystal oscillator by Equation (a).

(Evaluation 2: Content of Fluorine Oil in Surface Layer)

A first surface and a second surface of a separate measurement sample were cleaned. Next, in the measurement sample, measurements were performed under the following conditions using a thermogravimetric analysis apparatus (TGA) to evaluate a content ratio (% by mass) of the fluorine oil to the surface layer.

Apparatus: TGA851 (manufactured by METTLER TOLEDO);
Atmosphere: in the air; and
Temperature: 425° C.

In a measurement time-weight loss rate profile obtained by the thermogravimetric analysis, a linear least-squares approximate expression was calculated from a region (specifically, the measurement time was 3000 sec or longer) in which a slope was constant and only PFA was reduced. An intercept of the linear least-squares approximate expression was defined as a PFA amount (% by mass), and a PFPE content (% by mass) was calculated as a 100−PFA amount.

(Evaluation 3: Relative Ratio of PFPE Amounts on First Surface Side and Second Surface Side of Surface Layer)

Further, the first surface and the second surface of the separate measurement sample were cleaned. Next, in the measurement sample, a relative ratio of PFPE amounts (hereinafter, referred to as a "PFPE relative amount ratio") was calculated by measuring the PFPE amounts on a first surface side and a second surface side by an ATR method with an infrared spectrometer (trade name: Frontier MIRNIR, manufactured by PerkinElmer Co., Ltd.).

Specifically, a peak ratio was calculated by dividing a height of a peak (Krytox type: 986 cm$^{-1}$, Demnum type: 1010 cm$^{-1}$, Fomblin type: 1052 cm$^{-1}$) that appears in only PFPE by a height of a peak (1146 cm$^{-1}$) that appears in only PFA from each profile obtained by the infrared spectroscopic analysis. Next, the PFPE relative amount ratio was calculated by dividing the peak ratio calculated from the measurement result of the second surface side by the peak ratio calculated from the measurement result of the first surface side.

(Evaluation 4: Evaluation of Presence and Absence of Toner Offset)

The fixing belt No. 1 was mounted on an electrophotographic image forming apparatus in which an angle of a separation claw of a paper was adjusted (trade name: image RUNNER-ADVANCE C5051; manufactured by Canon Inc.).

Then, an image forming process of forming a solid image of 10 cm×10 cm with a cyan color on an A4 size paper (manufactured by International Paper Company, basis weight of 75 g/m$^2$) was performed. A fixing temperature was 180° C. and a conveying speed of the paper was set to 300 mm/sec.

Then, a solid image of 10 cm×10 cm with a cyan color was formed by passing one sheet of an A4 size thin plain paper (trade name: CS-520, basis weight of 52 g/m$^2$, manufactured by Canon Inc.) at each point of time when the number of sheets on which the solid image with cyan is formed reaches 1, 100, and 100,000 sheets. The solid image formed on the thin plain paper was observed with the naked-eye and a microscope and was evaluated based on the following criteria.

(Evaluation Criteria)
Rank A: There were no both toner offset and toner drop-out.
Rank B: Trace amounts of toner offset and toner drop-out were observed.
Rank C: Both toner offset and toner drop-out were observed.
Rank D: The thin plain paper was stuck to the fixing belt.

(Evaluation 5: Measurement of Surface Free Energy)

In Evaluation 4, surface free energy of an outer surface of the fixing belt No. 1 immediately before formation of the solid image on the thin plain paper was calculated by a "Kitazaki-Hata method" described in "Journal of the Adhesion Society of Japan", The Adhesion Society of Japan, 1972, Volume 8, No. 3, p. 131-141. Specifically, in the outer surface of the fixing belt No. 1, contact angles between water, n-hexadecane, and diiodomethane were measured (measurement environment: temperature of 23° C., relative humidity of 55%).

Next, the surface free energy was obtained from an "extended Fowkes equation" by using the measurement result of each contact angle according to the description of "Journal of the Adhesion Society of Japan", The Adhesion Society of Japan, 1972, Volume 8, No. 3, p. 131-141, page 131, "2. Forks equation extension" to "3. Surface tension of polymer solid and its components".

For the measurement of the contact angle, a contact angle meter (trade name: DM-501, manufactured by Kyowa Interface Science) was used. For the surface free energy analysis, analysis software (trade name: FAMAS, manufactured by Kyowa Interface Science) was used.

Examples 2 to 18

Fixing belts Nos. 2 to 18 according to respective examples were prepared in the same manner as that of Example 1, except that the types of fluororesin used in the surface layer, the type of fluorine oil, and the temperature of the fluorine oil at the time of contact were changed as shown in Table 1.

Example 19

A fixing belt No. 19 was prepared in the same manner as that of Example 1, except that in Example 1, the time for contacting the fixing member with the fluorine oil was set to 1 minute, to be used for Evaluation 1 to Evaluation 5.

Example 20

A fixing belt No. 20 was prepared in the same manner as that of Example 1, except that in Example 1, a solution obtained by diluting PFPE in a fluorine-based solvent (trade name: Novec7300, manufactured by 3M Company) was applied to the surface of the fixing member in a spray manner, and the fixing member was put into a drier and heated at 285° C. for 5 minutes.

Comparative Example 1

A pre-fixing belt was prepared by the method described in Example 1, and used as a fixing belt No. C-1 according to the present comparative example.

Comparative Example 2

Sodium naphthalene (trade name: TETRA-ETCH, manufactured by Junkosha Inc.) was applied to an outer surface of the fixing belt No. C-1, and the outer surface was chemically hydrophilized.

Next, PFPE (trade name: OPTOOL DSX, manufactured by DAIKIN INDUSTRIES, LTD.) having a molecular terminal modified with alkoxysilane was dissolved in a fluorine-based solvent (trade name: Novec7300, manufactured by 3M Company), and the solution was applied to the hydrophilized outer surface. Thereafter, the outer surface was burned in a dryer heated to 120° C. for 1 hour, thereby chemically fixing PFPE. Thereafter, the outer surface to which PFPE was chemically fixed was cleaned with the fluorine-based solvent, thereby preparing a fixing belt No. C-2 according to the present comparative example.

Comparative Example 3

A fixing belt No. C-3 was prepared in the same manner as that of Example 1, except that the temperature of the fluorine oil brought into contact with an outer surface of the pre-fixing belt was set to 210° C.

Comparative Example 4

A primer-treated base layer was prepared by the method described in Example 1. A surface of the base layer was treated with excimer UV Next, two spray guns were prepared. One spray gun was filled with an aqueous dispersion coating material of PFA particles (trade name: AW-5000L, manufactured by DAIKIN INDUSTRIES, LTD., melting point of 300° C.). The other spray gun was filled with a solution obtained by dissolving PFPE-1 in a fluorine-based solvent (trade name: Novec7300, manufactured by 3M Company). Then, the aqueous dispersion coating material of PFA and PFPE were applied to the surface of the base layer by using these spray guns, thereby forming a coating film containing the PFA particles and PFPE and having a thickness of 20 µm. At this time, an application amount of the spray gun was adjusted so that a content of PFPE-1 in the coating film was 2.0% by mass.

Figure 2:
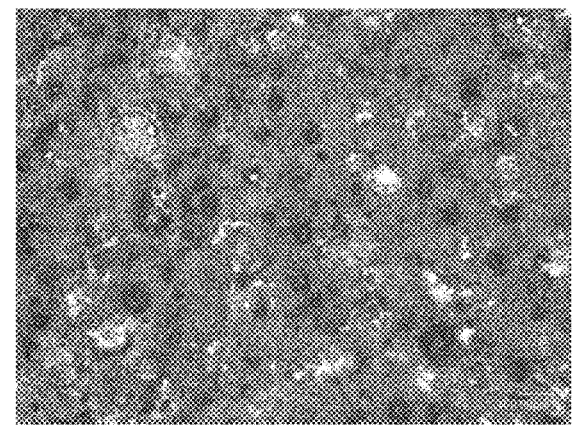
FIG. 2 is a surface observation image of a fixing member according to Comparative Example 4.

Next, the coating film was heated at a temperature of 350° C. for 15 minutes to melt the PFA particles in the coating film and thus to form a surface layer, thereby preparing a fixing belt No. C-4 according to Comparative Example 4. An SEM image of a first surface side of the surface layer of the fixing belt No. C-4 is illustrated in FIG. 2. From FIG. 2, aggregation of PFPE can be observed, and it can be appreciated that PFA is not compatible with PFPE.

The fixing belts Nos. 2 to 20 and the fixing belts Nos. C-1 to C-4 were used for Evaluation 1 to Evaluation 5. The evaluation results of the fixing belts Nos. 1 to 20 and the fixing belts Nos. C-1 to C-4 are shown in Table 2 and Table 3.

TABLE 2

| | Fluororesin | | | | Fluorine oil | | | | | | Relative ratio of |
| | | | | | Temperature [° C.] at | Fluorine oil | | | | | |
| | Type of material | Melting point [° C.] | Film thickness [µm] | Type of material | the time of contact | [% by mass] | P11 [×10$^2$ ng] | P12 [×10$^2$ ng] | P12/P11 | P21 [×10$^2$ ng] | PFPE amount |
|---|---|---|---|---|---|---|---|---|---|---|---|
| Example 1 | PFA-1 | 296 | 20 | PFPE-1 | 285 | 8.4 | 28 | 22 | 0.80 | 47 | 1.65 |
| Example 2 | PFA-1 | 296 | 20 | PFPE-1 | 250 | 1.2 | 1.5 | 0.8 | 0.52 | 2.7 | 1.49 |
| Example 3 | PFA-1 | 296 | 20 | PFPE-1 | 265 | 5.4 | 14 | 11 | 0.75 | 25 | 1.56 |
| Example 4 | PFA-1 | 296 | 20 | PFPE-1 | 293 | 11 | 40 | 34 | 0.85 | 68 | 1.67 |
| Example 5 | PFA-1 | 296 | 20 | PFPE-1 | 310 | 15 | 24 | 21 | 0.88 | 45 | 1.68 |
| Example 6 | PFA-1 | 296 | 20 | PFPE-1 | 345 | 20 | 49 | 46 | 0.94 | 88 | 1.72 |
| Example 7 | PFA-1 | 296 | 20 | PFPE-2 | 345 | 24 | 95 | 92 | 0.97 | 155 | 1.69 |

TABLE 2-continued

| | Fluororesin | | | Fluorine oil | | | | | | Relative ratio of PFPE amount |
|---|---|---|---|---|---|---|---|---|---|---|
| | Type of material | Melting point [° C.] | Film thickness [μm] | Type of material | Temperature [° C.] at the time of contact | Fluorine oil content [% by mass] | P11 [×$10^2$ ng] | P12 [×$10^2$ ng] | P12/P11 | P21 [×$10^2$ ng] | |
| Example 8 | PFA-1 | 296 | 40 | PFPE-1 | 285 | 7.3 | 24 | 18 | 0.75 | 40 | 1.65 |
| Example 9 | PFA-1 | 296 | 20 | PFPE-3 | 285 | 4.9 | 34 | 37 | 1.09 | 52 | 1.51 |
| Example 10 | PFA-1 | 296 | 20 | PFPE-4 | 285 | 8.8 | 29 | 25 | 0.85 | 43 | 1.62 |
| Example 11 | PFA-1 | 296 | 20 | PFPE-5 | 285 | 8.1 | 20 | 16 | 0.82 | 30 | 1.61 |
| Example 12 | PFA-1 | 296 | 20 | PFPE-6 | 285 | 7.5 | 21 | 17 | 0.79 | 29 | 1.59 |
| Example 13 | PFA-2 | 308 | 20 | PFPE-1 | 285 | 4.5 | 18 | 13 | 0.72 | 31 | 1.59 |
| Example 14 | PFA-2 | 308 | 20 | PFPE-1 | 315 | 11 | 15 | 13 | 0.83 | 24 | 1.66 |
| Example 15 | PFA-2 | 308 | 20 | PFPE-5 | 285 | 4.1 | 14 | 12 | 0.87 | 23 | 1.67 |
| Example 16 | PFA-2 | 308 | 20 | PFPE-6 | 285 | 4.0 | 10 | 8.5 | 0.85 | 18 | 1.61 |
| Example 17 | PFA-3 | 291 | 20 | PFPE-1 | 285 | 7.2 | 26 | 23 | 0.88 | 45 | 1.62 |
| Example 18 | PFA-4 | 305 | 20 | PFPE-1 | 285 | 5.3 | 19 | 14 | 0.75 | 30 | 1.63 |
| Example 19 | PFA-1 | 296 | 20 | PFPE-1 | 285 | 7.8 | 25 | 19 | 0.76 | 41 | 1.61 |
| Example 20 | PFA-1 | 296 | 20 | PFPE-1 | 285 | 8.2 | 31 | 26 | 0.83 | 53 | 1.65 |
| Comparative Example 1 | PFA-1 | 296 | 20 | — | — | — | — | — | — | — | — |
| Comparative Example 2 | PFA-1 | 296 | 20 | optool DSX | — | — | 0.20 | 0.2 | 1.00 | — | — |
| Comparative Example 3 | PFA-1 | 296 | 20 | PFPE-1 | 210 | 0.95 | 0.92 | 0.44 | 0.48 | 0.51 | 0.55 |
| Comparative Example 4 | PFA-5 | 300 | 20 | PFPE-1 | — | 2.0 | 15 | 7.2 | 0.48 | 5.8 | 0.43 |

The results of using the fixing members prepared in Examples 1 to 20 and Comparative Examples 1 to 4 for Evaluation 1 and Evaluation 2 are shown in Table 3.

TABLE 3

| | Surface free energy [mJ/m$^2$] | | | Toner offset | | |
|---|---|---|---|---|---|---|
| | Before passing paper | Passing 100 sheets of paper | Passing 100,000 sheets of paper | Passing 1 sheet of paper | Passing 100 sheets of paper | Passing 100,000 sheets of paper |
| Example 1 | 13.8 | 13.9 | 13.9 | A | A | A |
| Example 2 | 14.5 | 14.7 | 14.9 | A | B | B |
| Example 3 | 14.0 | 14.1 | 14.5 | A | A | A |
| Example 4 | 13.9 | 13.8 | 14.1 | A | A | A |
| Example 5 | 13.8 | 13.8 | 13.9 | A | A | A |
| Example 6 | 13.8 | 13.8 | 13.9 | A | A | A |
| Example 7 | 13.6 | 13.8 | 13.7 | A | A | A |
| Example 8 | 13.8 | 13.9 | 14.0 | A | A | A |
| Example 9 | 14.0 | 14.1 | 14.6 | A | A | B |
| Example 10 | 13.6 | 13.7 | 13.9 | A | A | A |
| Example 11 | 13.7 | 13.7 | 14.0 | A | A | A |
| Example 12 | 13.8 | 13.8 | 14.0 | A | A | A |
| Example 13 | 14.0 | 14.1 | 14.3 | A | A | A |
| Example 14 | 13.7 | 13.7 | 13.9 | A | A | A |
| Example 15 | 13.9 | 14.0 | 14.2 | A | A | A |
| Example 16 | 14.0 | 14.1 | 14.3 | A | A | A |
| Example 17 | 13.8 | 13.9 | 14.1 | A | A | A |
| Example 18 | 14.0 | 14.0 | 14.2 | A | A | A |
| Example 19 | 13.7 | 13.8 | 13.9 | A | A | A |
| Example 20 | 13.8 | 13.8 | 13.9 | A | A | A |
| Comparative Example 1 | 17.6 | 17.7 | 18.5 | D | D | D |
| Comparative Example 2 | 13.9 | 15.1 | 17.9 | A | C | D |
| Comparative Example 3 | 14.6 | 16.2 | 17.3 | B | C | C |
| Comparative Example 4 | 13.6 | 14.8 | 17.5 | A | B | D |

From Table 3, it was found that, in the fixing member according to the present embodiment, excellent toner releasability was maintained even after long-term use, and as a result, a high quality electrophotographic image was formed.

The present disclosure is not limited to the above embodiments, and various alterations and modifications may be made without departing from the spirit and the scope of the present disclosure. Accordingly, in order to publicize the scope of the present disclosure, the following claims are attached.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing member for electrophotography comprising:
a base layer; and a surface layer provided on an outer surface of the base layer directly or with a primer layer interposed between the base layer and the surface layer,
the surface layer being constituted by a single layer,
the surface layer containing a fluororesin, and fluorine oil having a perfluoropolyether structure, and
the fixing member satisfying a requirement (i) and a requirement (ii):
(i) as for a measurement sample taken from the fixing member and including an entire thickness portion of the surface layer, when subjecting to a treatment including cleaning a predetermined position of a first surface of the measurement sample which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered material adhered in a unit area (1 cm$^2$) of the detection surface and including the fluorine oil having the perfluoropolyether structure is $1.0 \times 10^2$ ng or more and $1.0 \times 10^4$ ng or less; and
(ii) as for the measurement sample subjected to the treatment defined in the requirement (i), when subjecting to a treatment including, after cleaning the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered material adhered in the unit area (1 cm²) of the detection surface and including the fluorine oil having the perfluoropolyether structure is 0.5×P11 or more and 1.2×P11 or less.

2. A fixing member for electrophotography comprising:
a base layer; and a surface layer provided on an outer surface of the base layer directly or with a primer layer interposed between the base layer and the surface layer, the surface layer being constituted by a single layer, the surface layer containing a fluororesin, and fluorine oil having a perfluoropolyether structure, wherein
as for a measurement sample taken from the fixing member and including an entire thickness portion of the surface layer, when pressing a detection surface of a quartz crystal microbalance (QCM) sensor against a first surface of the measurement sample which is an opposite side to a side facing the base layer at a pressure of 0.4 MPa and a temperature of 180° C. for 50 msec, a mass of an adhered material adhered in a unit area (1 cm²) of the detection surface and including the fluorine oil having the perfluoropolyether structure is defined as P11 (ng), and
when pressing the detection surface of the quartz crystal microbalance (QCM) sensor against a second surface of the measurement sample which is the side facing the base layer of the measurement sample at a pressure of 0.4 MPa and a temperature of 180° C. for 50 msec, a mass of an adhered material adhered in the unit area (1 cm²) of the detection surface and including the fluorine oil having the perfluoropolyether structure is defined as P21 (ng), P21>P11.

3. The fixing member according to claim 1, wherein a content of the fluorine oil having the perfluoropolyether structure in the surface layer is 1.0% by mass or more and 25% by mass or less of the surface layer.

4. The fixing member according to claim 1, wherein P11 is $1.0 \times 10^2$ ng or more and $5.0 \times 10^3$ ng or less.

5. The fixing member according to claim 1, wherein the fluororesin is a tetrafluoroethylene-perfluoroalkyl vinyl ether copolymer (PFA).

6. The fixing member according to claim 1, wherein a thickness of the surface layer is 5.0 μm or more and 50 μm or less.

7. The fixing member according to claim 1, wherein the fluorine oil is perfluoropolyether.

8. The fixing member according to claim 7, wherein the perfluoropolyether has a chemical structure represented by Structural Formula (1):

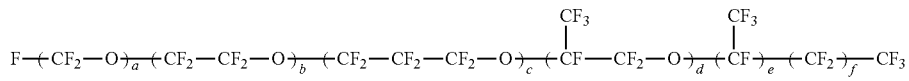

in Structural Formula (1), a, b, c, d, e, and f are each independently 0 or a positive integer, 1≤a+b+c+d+e+f≤600, and at least one of a, b, c, or d is a positive integer.

9. The fixing member according to claim 7, wherein the perfluoropolyether has at least one chemical structure selected from Structural Formulas (2) to (4):

in Structural Formulas (2) to (4), m and n each independently represent an integer of 1 or more.

10. The fixing member according to claim 9, wherein the perfluoropolyether has the chemical structure of Formula (2), P11 is $1.0 \times 10^2$ ng or more and $5.0 \times 10^3$ ng or less, and a content of the perfluoropolyether in the surface layer is 1.0% by mass or more and 25% by mass or less of the surface layer.

11. The fixing member according to claim 1, wherein the fixing member is a fixing belt having an endless belt shape.

12. A fixing device comprising: a fixing member for electrophotography; and a heating unit of the fixing member, wherein
the fixing member including:
a base layer; and a surface layer provided on an outer surface of the base layer directly or with a primer layer interposed between the base layer and the surface layer, wherein the surface layer is constituted by a single layer,
the surface layer contains a fluororesin, and fluorine oil having a perfluoropolyether structure, and
the fixing member satisfies a requirement (i) and a requirement (ii):
(i) as for a measurement sample taken from the fixing member and including an entire thickness portion of the surface layer, when subjecting to a treatment including cleaning a predetermined position of a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered material adhered in a unit area (1 cm²) of the detection surface and including the fluorine oil having the perfluoropolyether structure is $1.0 \times 10^2$ ng or more and $1.0 \times 10^4$ ng or less; and
(ii) as for the measurement sample subjected to the treatment defined in the requirement (i), when subjecting to a treatment including, after cleaning the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered material adhered in the unit area (1 cm²) of the detection surface and including the fluorine oil having the perfluoropolyether structure is 0.5×P11 or more and 1.2×P11 or less.

13. The fixing device according to claim 12, wherein the fixing member is a fixing belt having an endless belt shape, and the heating unit is a heater disposed in contact with an inner circumferential surface of the fixing belt.

14. An electrophotographic image forming apparatus comprising a fixing device, the fixing device including: a fixing member for electrophotography; and a heating unit of the fixing member, wherein the fixing member including:
- a base layer; and a surface layer provided on an outer surface of the base layer directly or with a primer layer interposed between the base layer and the surface layer, wherein the surface layer is constituted by a single layer, the surface layer contains a fluororesin, and fluorine oil having a perfluoropolyether structure, and the fixing member satisfies a requirement (i) and a requirement (ii):

(i) as for a measurement sample taken from the fixing member and including an entire thickness portion of the surface layer, when subjecting to a treatment including cleaning a predetermined position of a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered material adhered in a unit area (1 cm$^2$) of the detection surface and including the fluorine oil having the perfluoropolyether structure is $1.0 \times 10^2$ ng or more and $1.0 \times 10^4$ ng or less; and (ii) as for the measurement sample subjected to the treatment defined in the requirement (i), when subjecting to a treatment including, after cleaning the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered material adhered in the unit area (1 cm$^2$) of the detection surface and including the fluorine oil having the perfluoropolyether structure is 0.5×P11 or more and 1.2×P11 or less.

* * * * *